United States Patent [19]

Bertling et al.

[11] Patent Number: 5,323,302

[45] Date of Patent: Jun. 21, 1994

[54] ILLUMINATION DEVICE

[75] Inventors: Johannes-Gerhard Bertling, Vaihingen/Enz; Doris Boebel; Peter Schoettle, both of Stuttgart, all of Fed. Rep. of Germany

[73] Assignee: Robert Bosch GmbH, Stuttgart, Fed. Rep. of Germany

[21] Appl. No.: 23,586

[22] Filed: Feb. 26, 1993

[30] Foreign Application Priority Data

May 12, 1992 [DE] Fed. Rep. of Germany ....... 4215584

[51] Int. Cl.$^5$ .............................................. F21V 7/00
[52] U.S. Cl. ...................... 362/308; 362/61; 362/328
[58] Field of Search ............... 362/61, 80, 307, 308, 362/309, 343, 328, 80.1

[56] References Cited

U.S. PATENT DOCUMENTS 5,065,288  11/1991  Bröggelwirth ................. 362/309 X
5,186,533  2/1993   Hori ............................... 362/80.1

FOREIGN PATENT DOCUMENTS 3013040  10/1981  Fed. Rep. of Germany .

*Primary Examiner*—Stephen F. Husar
*Attorney, Agent, or Firm*—Michael J. Striker

[57]  ABSTRACT

An illumination device comprises a light source, a reflector which reflects light emitted by the light source, a light disc, and a plurality of optically active elements arranged in a path of rays of the light reflected by the reflector for at least one of dispersing and deviating of the light, the optically active elements being formed as diffraction-optical elements and together forming a diffraction grating which is formed as a member which is separate from the light disc.

9 Claims, 1 Drawing Sheet

ILLUMINATION DEVICE

BACKGROUND OF THE INVENTION

The present invention relates to an illumination device. One of such illumination devices is disclosed, for example, in the German document DE 3,013,040. This illumination device is formed as a headlight and has light source, a reflector and a light disc. Moreover, as conventional, this headlight has optically active elements arranged in the path of rays of the light which is sent from the light source and reflected by the reflector. The optically active elements deviate and/or disperse the light which is sent from the light source and reflected by the reflector so that it provides a desired light distribution. The optically active elements are formed as prisms and/or lenses and arranged on the light disc. The optically active elements have a substantial thickness and therefore the weight of the light disc is increased. The optically active elements must be adjusted moreover exactly to the orientation of the light disc or in other words to its inclination and/or turning, so that for different headlights they must be formed differently. Due to different shapes of the light disc, for example rectangular or round shapes, different shaping tools are needed for producing the light discs. These tools form the optically active elements on the light disc and therefore are very expensive. For each headlight type a special light disc is needed, and it is connected with high manufacturing expenses.

SUMMARY OF THE INVENTION

Accordingly, it is an object of the present invention to provide an illumination device which avoids the disadvantages of the prior art.

In keeping with these objects and with others which will become apparent hereinafter, one feature of the present invention resides, briefly stated, in an illumination device in which the optically active elements are formed as diffraction-optical elements and together form a diffraction grating (grate) which is formed on a part separate from the light disc.

When the illumination device is designed in accordance with the present invention, the diffraction grating with the diffraction-optical elements can be produced independently from the light disc, the same diffraction grating can be utilized for different illumination devices. Moreover, the member which is provided with the diffraction grating has a small thickness, and therefore its weight and the total weight of the illumination device is reduced.

In accordance with another feature of the present invention, at least a part of the diffraction-optical elements is formed by microprisms which deviate the passing light in predetermined directions horizontally and/or vertically. At least a part of the diffraction-optical elements can be formed by dispersion elements which disperse the passing light in horizontal and/or vertical directions. Such diffraction-optical elements can produce a predetermined light distribution.

In accordance with still another feature of the present invention the diffraction grating can be formed on a foil. Therefore the diffraction grating can be adjusted flexibly in the illumination direction.

The diffraction grating can be produced by shaping from an original grating, in accordance with still another advantageous feature of the present invention. With this procedure an original grating is first made, and then it can be produced in a simple manner.

In accordance with still a further feature of the present invention the grating periods or in other words the vertical distance of the diffraction-optical elements from one another in the diffraction grating are changeable at least partially. Thereby the splitting of the light which passes through the diffraction grating in accordance with its wavelength can be avoided. The light splitted after the diffraction grating can be further mixed so that no different colors can be noticeable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
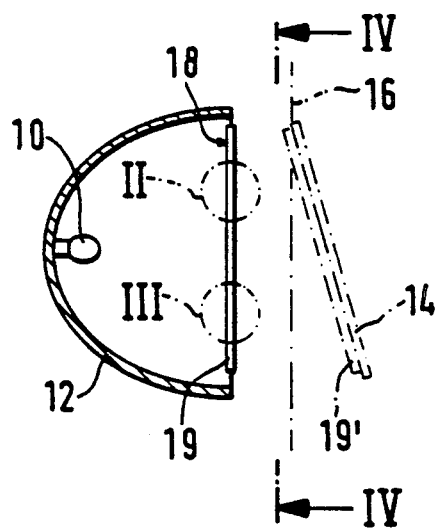
FIG. 1 is a view showing a vertical longitudinal section of an illumination device in accordance with the present invention.

FIG. 1 shows an illumination device in accordance with the present invention, which can be used for example as a headlight or head lamp. When the illumination device is used in motor vehicles, it can be used as dimming light, high beam light, fog light and also as a signal lamp.

The illumination device has a light source 10 which can be formed as an incandescent lamp or a gas discharge lamp. for efficiently using the light which is sent by the light source 10, a reflector 12 is utilized. With the reflector the light sent by the light source 10 covers a predetermined spatial angle and is reflected in the light outlet opening of the illumination device. The light outlet opening of the illumination device is covered with a transparent light disc 14 which can be composed of glass or synthetic plastic material. The light disc 14 can be flat or curved. It can be inclined relative to a vertical and/or turned relative to a horizontal.

A diffraction grating 18 is arranged in the path of rays of the light which is sent by the light source 10 and reflected by the reflector 12. The diffraction grating 18 has diffraction-optical elements which influence the passing light. The diffraction-optical elements can be formed as microprisms and/or in linear grating.

Figure 2:
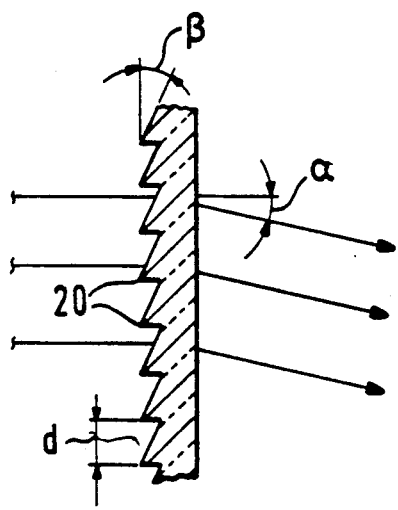
FIG. 2 is a view showing a portion of FIG. 1 identified with reference numeral II on an enlarged scale.

A substantially increased portion of the diffraction grating 18 of FIG. 1 is shown in FIG. 2. In the region of this portion the diffraction optical elements are formed as microprisms 20. The microprisms 20 can be arranged vertically over one another, horizontally near one another or inclinedly depending on a direction in which the light must be deflected. The grating period d which corresponds to the distance between two adjacent microprisms or their width, is in the region $$\lambda \leq d \leq 50 \cdot \lambda$$

wherein λ is a wavelength of the light emitted by the light source 10. The width of the microprisms 10 is very small with respect to their extension in particular to their width. The height h of the microprisms 20 is smaller by substantially one order of magnitude than the grating period d. A diffraction grating with microprisms is identified as an echelett grating or an echelle grating. An echelett grating provides a deviation of light by a predetermined angle α in one direction. The deviation angle α depends on the grating period, while the intensity distribution provided by the diffraction grating depends on the structure or in other words on the shape of the microprisms. The deviation angle α can be determined from the following equation:

$$\sin \alpha = \frac{m \cdot \lambda}{a}$$

wherein m is the diffraction order.

The diffracted light is concentrated by the echelett grating approximately completely in a diffraction order m, then the deviation due to the refraction on the microprisms 20 coincides with the deviation due diffraction. The condition that the deviation due to refraction coincides with the deviation due to diffraction corresponds to the following ratio:

$$\tan \beta = \frac{m \cdot \lambda}{a \cdot \left[ \sqrt{n^2 - \left(\frac{m \cdot \lambda}{a}\right)^2} - 1 \right]}$$

wherein n is a refraction index of the material used for the diffraction grating;

β is a prism angle of the microprisms.

Under this condition the passing light is deviated, as is known microscopic prisms, completely in a predetermined direction. The construction of the diffraction grating is based on an average wavelength λO of the light emitted by the light source 10, since the light source has not only light of one wavelength but different wavelengths. The grating period d can be changed, in order to deliberately provide different deviation angles α in different regions of the diffraction grating 18.

Figure 3:
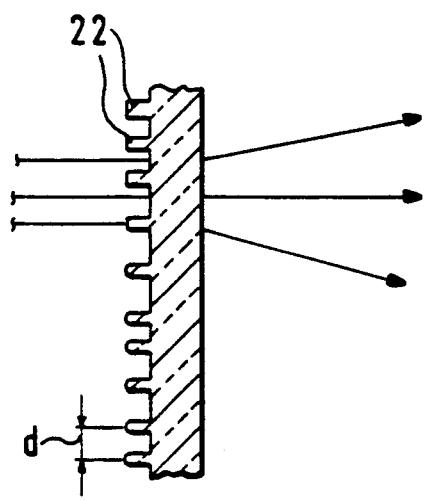
FIG. 3 is a view showing a portion of FIG. identified with reference numeral III on an enlarged scale.

FIG. 3 shows a substantially increased portion of the diffraction grating 18 of FIG. 1, located in another region than the portion of FIG. 2. In the region of this portion the diffraction-optical elements are formed as dispersing elements 22 which disperse the light perpendicularly to planes. The dispersing elements 22 together form a line grating and can be shaped as ribs projecting from a base surface. They can be rectangular or can have rounded shapes. The vertical distance between two ribs 22 corresponds to the grating period D and the extension of the ribs 22 is many times greater than the distance D. The grating period D is in the region $$\lambda \leq d \leq 100 \cdot \lambda$$

The dispersing elements 22 produce a diverging light beam. The light intensity is distributed to several diffraction orders so that a uniform intensity distribution is produced in an angular region located in one plane. When the illumination device is used as a headlight in a motor vehicle, the dispersing elements 22 are preferably arranged so that their greater extension extends substantially vertically and therefore a dissipation of the light in horizontal planes is produced. The grating period d of the dispersion elements 22 can be changed as with the microprisms 20 and therefore different dispersion angle can be obtained. In addition, due to a changing grating period d a merging of the diffraction orders is obtained.

In the illumination device shown in FIG. 1 the diffraction grating 18 between the light source 10 and the light disc 14 is formed as a flat screen 19. In a variant shown in broken line in FIG. 1 the diffraction grating 18 is formed as a foil 19' which is arranged on the light disc 14 and can be composed of synthetic plastic material. The light disc 14 serves however only for covering the light outlet opening of the illumination device and does not have any optically active elements itself.

Figure 4:
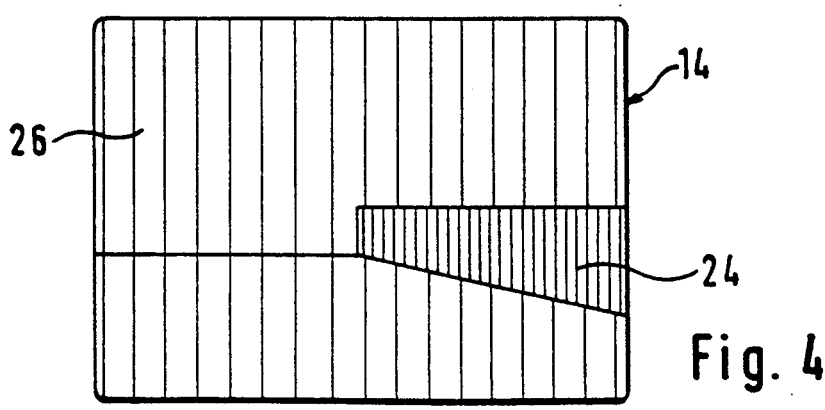
FIG. 4 is a view showing the illumination device of FIG. 1 in a section taken along the line IV—IV.

When the diffraction grating 18 is used in the illumination device as motor vehicle headlights as shown in FIG. 4, different regions of it can be provided with different diffraction-optical elements. For example, the diffraction grating 18 for producing an asymmetrical light distribution can have a gusset region 24 in which the microprisms 20 are arranged, and other regions 26 in which the dispersing elements 22 are arranged.

During the manufacture of the diffraction grating 18 first an original grating is produced with high accuracy. Then from the original grating copies are made by deformation or shaping. Copies can be formed as flexible foils or rigid bodies.

It will be understood that each of the elements described above, or two or more together, may also find a useful application in other types of constructions differing from the types described above.

While the invention has been illustrated and described as embodied in an illumination device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An illumination device, comprising a light source; a reflector which reflects light emitted by said light source; a light disc; and a plurality of optically active elements arranged in a path of rays of the light reflected by said reflector for at least one of dispersing and deviating of the light, said optically active elements being formed as diffraction-optical elements and together forming a diffraction grating which is formed as a member which is separate from said light disc.

2. An illumination device as defined in claim 1, wherein at least a part of said diffraction-optical elements are formed by microprisms which deviate passing light in at least one of a horizontal direction and a vertical direction.

3. An illumination device as defined in claim 1, wherein at least a part of said diffraction-optical elements are formed as dispersion elements which disperse passing light in at least one of a horizontal direction and a vertical direction.

4. An illumination device as defined in claim 1, wherein said dispersion grating is arranged in a path of rays between said light source and said light disc.

5. An illumination device as defined in claim 1, wherein said dispersion grating is formed as a foil which forms said member.

6. An illumination device as defined in claim 5, wherein said light disc has a side which faces toward said light source, said foil being arranged on said side of said light disc.

7. An illumination device as defined in claim 5, wherein said foil is composed of synthetic plastic material.

8. An illumination device as defined in claim 1, wherein said diffraction grating is shaped from an original grating.

9. An illumination device as defined in claim 1, wherein said diffraction grating has grate periods formed by distances between said diffraction elements and being at least partially changeable.

* * * * *